US010086554B2

(12) United States Patent
Desoutter et al.

(10) Patent No.: US 10,086,554 B2
(45) Date of Patent: Oct. 2, 2018

(54) METHOD AND MACHINE FOR MANUFACTURING PLASTIC CONTAINERS

(71) Applicant: DISCMA AG, Zürich (CH)

(72) Inventors: Luc Desoutter, Octeville-sur-Mer (FR); Daniel Diesnis, Octeville-sur-Mer (FR)

(73) Assignee: DISCMA AG, Zürich (CH)

( * ) Notice: Subject to any disclaimer, the term of this patent is extended or adjusted under 35 U.S.C. 154(b) by 278 days.

(21) Appl. No.: 14/786,406

(22) PCT Filed: Apr. 18, 2014

(86) PCT No.: PCT/EP2014/058015
§ 371 (c)(1),
(2) Date: Oct. 22, 2015

(87) PCT Pub. No.: WO2014/173845
PCT Pub. Date: Oct. 30, 2014

(65) Prior Publication Data
US 2016/0089828 A1    Mar. 31, 2016

(30) Foreign Application Priority Data

Apr. 24, 2013  (EP) .................................... 13305538

(51) Int. Cl.
*B29C 49/46* (2006.01)
*B29K 67/00* (2006.01)
*B29C 49/06* (2006.01)
*B29K 105/00* (2006.01)
*B29L 31/00* (2006.01)

(52) U.S. Cl.
CPC .............. *B29C 49/46* (2013.01); *B29C 49/06* (2013.01); *B29C 2049/4664* (2013.01); *B29C 2049/4673* (2013.01); *B29K 2067/00* (2013.01); *B29K 2105/258* (2013.01); *B29L 2031/7158* (2013.01)

(58) Field of Classification Search
None
See application file for complete search history.

(56) References Cited

U.S. PATENT DOCUMENTS

2010/0047120 A1   2/2010  Adriansens et al.
2011/0300249 A1   12/2011 Andison et al.

FOREIGN PATENT DOCUMENTS

JP    S59129125 A    7/1984
WO    2010003873 A1  1/2010
WO    2012116776 A1  9/2012

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

A method for manufacturing plastic containers in which, for each container, a plastic preform containing air is supplied; the preform is heated at a preform temperature over the glass temperature of the preform material, the preform is inserted in a mold having a mold cavity; and the preform is expanded to a container having the shape of a mold cavity by a forming liquid. The method also includes, between steps (b) and (d), the injecting of a gaseous product into the preform containing air, wherein the gaseous product is absorbable by the forming liquid. The injection conditions of the gaseous product are selected such that the injected gaseous product expels the air out of the preform.

21 Claims, 1 Drawing Sheet

METHOD AND MACHINE FOR MANUFACTURING PLASTIC CONTAINERS

CROSS-REFERENCE TO RELATED APPLICATIONS

This application is the U.S. national phase of PCT Application No. PCT/EP2014/058015 filed on Apr. 18, 2014, and claims priority to EP13305538.4 filed on Apr. 24, 2013, the disclosures of which are incorporated in their entirety by reference herein.

TECHNICAL FIELD

The present invention relates to a method for manufacturing plastic containers by expanding a preform using a forming liquid.

The method is particularly adapted to hydraulic forming processes.

In the application, "liquid" has a physical meaning. It designates any incompressible and able to flow medium. The liquid can have a low viscosity (like water or alcohol), a medium viscosity (like edible oil or soup), or a high viscosity (like yogurt or creamy products). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND OF THE INVENTION

In the packaging industry, combining the forming, filling and capping function has become an industry standard, very often called "combi" or "block" machines, bringing equipment and installation compactness, bottle lightweight, ease of operation and industrial simplification. Hydraulic forming of the container brings the opportunity of an even more compact machine for the same result, as the forming and the filling are done in one step, and removes the need of using expensive and energy inefficient production of compressed gas, such as air.

Hydraulic forming allows rather high forming pressures as high as 50 bars, thus creating a very good impression of the formed container.

In hydraulic forming process, the preform is typically made of a thermoplastic material which can be chosen for instance among the following: thermoplastic polyesters such as PET, PEN, PEI, PTT, PLA, PEF, polyolefins such as PP, HDPE, LDPE, styrene based materials such as PS, ABS, others such as PVC.

Another significant advantage of hydraulic forming, whether assisted by stretching or not, resides in the fact that containers can be filled and formed at very high speed. Typically, the forming time (not including equilibration or cooling time) will range from 0.1 seconds to 1.0 second and more specifically from 0.1 to 0.2 second, whereas traditional filling for either ambient temperature filling of still products such as for water, carbonated drinks filling, hot filling of still products, or aseptic filling of sensitive products, requires from 4 to 15 seconds of filling time.

This huge advantage carries a difficulty which is about evacuating or removing the air contained in the preform. If not removed, and because of the high liquid pressure used, this air will dissolve in the filled product and may generate some issues:

for still water: change of dissolved gas composition, change of acidity, foaming;

for carbonated water or any carbonated drinks: change in carbonation rate as the partial pressure of nitrogen and oxygen will increase, forcing $CO_2$ partial pressure to decrease (the total pressure which is the sum of the partial pressures do not change). Also, foaming will occur. Shelf life and quality of the product will be affected; and for hot filled products and aseptically filled sensitive products: increase of dissolved oxygen, meaning lower shelf life for oxygen sensitive products and the risk of foaming will be increased as well.

In the conventional air forming methods, the volume of air to remove is close to the volume of the bottle. During the filling process, the air is evacuated by a venting device during the duration of the filling operation.

In hydraulic forming, especially with high speed forming, the time to vent or evacuate the preform is very short, so that the air evacuation is difficult to control, with a high risk of losing product during this operation.

WO-A-2010/003873 discloses a method and an apparatus of the above-mentioned type, for injecting beverage into a preform and promoting the expansion of the preform. An injection head closes the preform. Sterilizing steam can be injected through a first conduit of the injection head. The only other conduit of the injecting head injects beverage, so air cannot be expelled from the preform.

US-2011/0300249 discloses the injection of steam in a preform as a sterilizing alternative to a sterilization obtained by a hot-fill process or obtained with a sterilization liquid such as liquid peroxide. The sterilizing process is described as the first step of a hydraulic forming process of a container.

SUMMARY OF THE INVENTION

The present invention aims at obtaining a satisfactory control of air evacuation from the preform in liquid forming processes.

To this end, the invention relates to a method for manufacturing plastic containers comprising, for each container:

(a) a preform supply step in which a plastic preform containing air is supplied;

(b) a thermal conditioning step in which the preform is heated at a preform temperature over the glass temperature of the preform material;

(c) an inserting step in which the preform is inserted in a mold having a mold cavity; and (d) a forming step in which the preform is expanded to a container having the shape of the mold cavity by means of a forming liquid, wherein the method further comprises a gaseous product injection step between steps (b) and (d), and during said gaseous product injection step, a gaseous product is injected into the preform containing air, said gaseous product being absorbable by said forming liquid, the injection conditions of the gaseous product being determined such that the injected gaseous product expels said air out of the preform.

In such a method, the injected gaseous product replaces air. When the forming step starts, air has been removed from the preform.

It is to be noted that the above-mentioned document WO-A-2010/003873 teaches away from removing air from the preform, steam being used for sterilizing purposes only and no vent allowing air to escape during the steam injection step. Similarly, US-2011/0300249 discloses steam being used for sterilizing purposes only. Furthermore, this document discloses that steam can be replaced by liquid peroxide, and as known, a sterilization using liquid peroxide has to occur before heating the preform in order to create the H2O2 vapor during heating. The injection of steam before the thermal conditioning step is not efficient for removing air from the preform before the forming step since air returns inside the preform during the transportation of said preform through a heating station.

According to another feature of the method according to the invention, the injection conditions of the gaseous product are determined such that the injected gaseous product expels at least 90% of the air present in the preform before said gaseous product injection step (g).

The gaseous injection step is therefore arranged such that the preform contains a maximal quantity of the gaseous product and a minimal quantity of air when said gaseous injection step is completed. Consequently, the method according to the invention guaranties a proper removal of the air from the preform when the forming step starts.

According to other features of the method according to the invention:

the preform extends along a main axis and the direction of the injection of the gaseous product is parallel to the main axis and radially offset relative to said main axis such that the gaseous product is injected in the vicinity of the inner wall of the preform;

the injection of the gaseous product is arranged such that the gaseous product flows against at least part of the inner wall of the preform.

The inventors have found out that injecting the gaseous product along an axis which is not aligned with the main axis of the preform such that the gaseous product flows against or in the vicinity of the inner wall of the preform improves the air removal from the preform, thereby ensuring that a lager quantity of air is removed from the preform and/or that the air removal occurs at a better pace, which can reduce the time required for performing the gaseous injection step.

According to other features of the method according to the invention:

the gaseous product injected during the gaseous product injection step (g) is still present when the forming step (d) starts such that said gaseous product is absorbed by the forming liquid during the forming step, therefore, air cannot enter again into the preform after being removed;

the method comprises a neck closing step (n) during which a neck of the preform is closed by a filling nozzle, the gaseous product injection step (g) taking place before the neck closing step;

the forming step (d) uses a forming liquid different from a final liquid to be contained by the container;

the forming step (d) uses a final liquid to be contained by the container as said forming liquid, whereby said forming step is a combined forming and filling step;

said gaseous product comprises steam;

said steam is injected at a steam temperature lower than the temperature of the preform;

said steam is injected at a steam temperature such that steam does not form liquid droplets inside the preform before step (d); this also contributes to the fact that air cannot enter again into the preform after being removed therefrom;

said gaseous product comprises 002;

the method further comprises a preform sterilizing step (f) upstream of said gaseous product injection step (g).

The invention also relates to a machine for manufacturing containers, the machine comprising, for each container:

a plastic preform supply station supplying a plastic preform containing air;

a thermal conditioning station adapted to heat the preform at a temperature over the glass temperature of the preform material; and a forming station comprising means for expanding the preform to a container having the shape of a mold cavity by means of a forming liquid, wherein the machine:

comprises gaseous product injecting means for injecting a gaseous product into the preform containing air, said injecting means being provided between said preform supply station and said forming station, or in said forming station, and determination means adapted to determine for a particular preform type injection conditions such that the gaseous product injected in the preforms of said type expels said air out from the preform.

According to other features of the machine according to the invention:

said gaseous product injecting means comprise at least one nozzle extending along an axis parallel to the main axis of the preform, when said preform is placed opposite said nozzle, the axis of the nozzle being radially offset relative to the axis of the preform;

said gaseous product injecting means are the last injecting means located upstream the forming station. Said gaseous product injecting means are the last ones that may inject a product before the introduction of the forming liquid. The filled liquid meets directly the gaseous product, that can be absorbed immediately by the liquid;

the supply station is a preform manufacturing station;

the machine further comprises a preform sterilizing station upstream of said gaseous product injecting means and said molding station.

Whatever the embodiment chosen, the principle of this invention is to load the heat conditioned preform with gaseous product, preferably saturated steam, so that the majority of the air inside the preform is removed from the preform. This can be done when the preform is already loaded in the forming mold or prior to it.

When the preform, positioned in the forming mold and loaded with gaseous product, is sealed to the forming head, the forming liquid (whether cold, warm or hot) is then injected and the gaseous product is immediately absorbed by the product without any significant impact on the liquid sterility and/or on its composition.

This is particularly the case when the liquid is a water based liquid and the gaseous product is steam. The water based liquid may be mineral water, carbonated water, flavored drinks as ice tea, or fruit juices One inherent advantage of this method is that it will actually either not change or slightly improve the heat profile of the preform, as for hydraulic forming, a preferred temperature profile is with a significantly higher temperature on the preform inner wall.

Another inherent advantage of this solution is that it is at least neutral to the sterility of the preforms. Exposure time and steam temperature may be chosen in order to promote sterilization effect, for instance with a steam temperature of 140° C. for 1 second.

An additional advantage is that when the preform is sterilized using $H_2O_2$ in a process such as Predis™, the operation of injecting steam after a thermal conditioning of the preform will a least not affect the level of sterility obtained. Furthermore, time and temperature of the steam injection can be designed so that the residuals of $H_2O_2$ will be further reduced.

It is to be noted that steam injection can also be used prior to air stretch blow molding for the purpose of further decontaminating and removing sterilizing media residuals.

BRIEF DESCRIPTION OF THE DRAWINGS

Other aspects and advantages of the invention will appear upon reading the following description, given by way of example and made in reference to the appended drawings, wherein.

DETAILED DESCRIPTION

Figure 1:
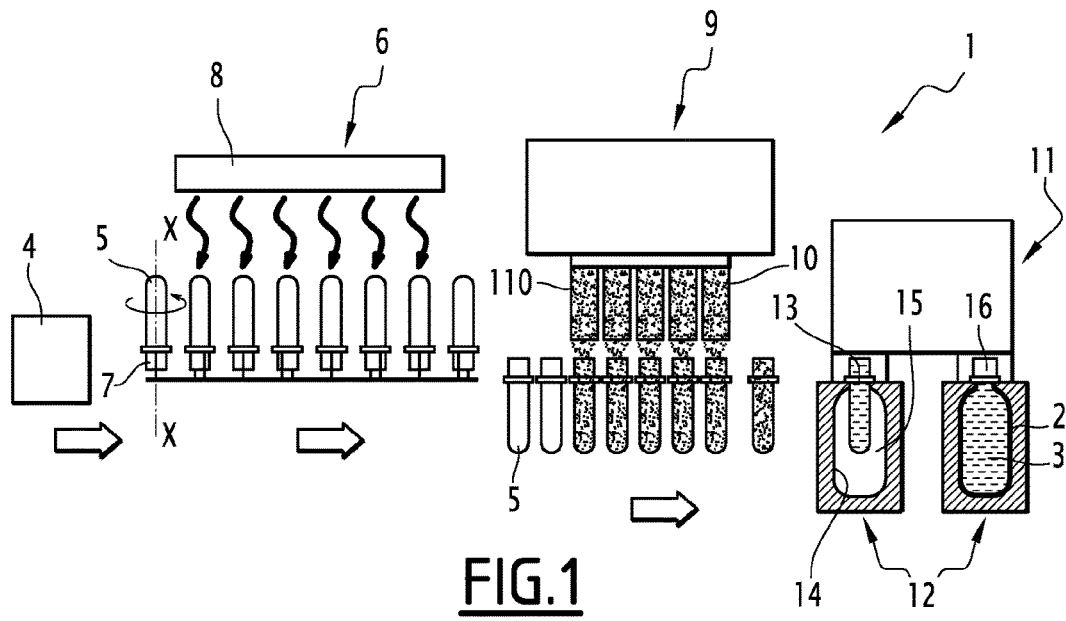
FIGS. 1 and 2 diagrammatically show two different embodiments of a machine according to the invention.

The machine 1 diagrammatically shown in FIG. 1 is adapted for manufacturing at very high speed plastic bottles 2 filled with an aqueous liquid 3, typically a still or carbonated beverage.

The machine 1 comprises four successive stations:

a preform manufacturing station 4, in which a series of successive preforms 5 are conventionally manufactured by an injection molding, compression molding or injection compression molding process;

a preform thermal conditioning station 6 in which the preforms, with their opening 7 directed downwards, are rotated about their axis X-X, disposed vertically, and subjected to a radiating heater system 8 to bring their wall temperature to a desired level, typically from 80° C. to 150° C.;

a steam injection station 9, in which the preforms 5, with their opening 7 directed upwards, are subjected to a downwardly directed flow of saturated steam 10. The steam, i.e. water vapor, is at a temperature slightly below the temperature of the preforms, typically 5 to 10° C. below the temperature of the preforms, so that no water condensation occurs. The steam issues from a plurality of nozzles 110 aligned along the path of the preforms. That path may be linear or circular for example. The nozzles 110 are have the same pitch as the preform pitch.

Figure 3:
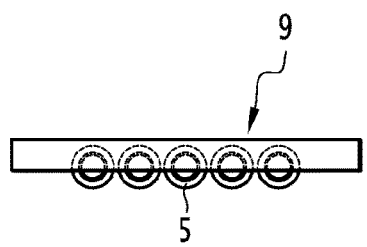
FIG. 3 diagrammatically shows the gaseous product injecting means and the preforms subjected to the gaseous injection step in a radial plane.

Each nozzle 110 extends along an axis A which is substantially parallel to the axis X-X of the preforms but not aligned with said axis X-X of the preforms. This means that the axis A of a nozzle 110 is radially offset relative to the axis X-X of the preforms, i.e. offset in a plane substantially perpendicular to the axis X-X of the preforms. As shown in FIG. 3 showing the steam injection station 9 and the preforms from above, the nozzles 110 are arranged in the vicinity of the inner wall of each preform such that the direction of the injected gaseous product parallel to the main axis causes the gaseous product to flow inside the preform 5 in the vicinity of part of its inner wall.

Figure 4:
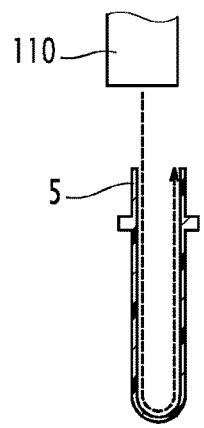
FIG. 4 is diagrammatical view in axial cross section of a preform subjected to the gaseous injection step.

More precisely, as shown in FIG. 4, the direction of the injection of the gaseous product can be arranged such that the gaseous product flows against the inner wall of the preform and covers said wall before completely filling the preform. With such a covering flow, the air present inside of the preform is moved out of said preform upwardly and is fast removed from the preform. Such a flow particularly guaranties that the air present at the bottom of the preform is moved out of the preform by the gaseous product flowing along the bottom of the preform.

According to the embodiment shown in the figures, the axis A of each nozzle is a vertical axis and the flow of the gaseous product flows downward in the vicinity or against the inner wall of the preform.

The linear or curvilinear speed of the preforms is selected such that each preform is subjected to the steam flow during about 1 second.

The flow rate of the steam is selected such that, when the preforms go out of station 9, substantially all the air they contained has been expelled by the steam and replaced by it. By substantially all the air, it is meant that at least 90% of the air present in the preform is expelled and replaced by the steam, preferably at least 95% and more preferably at least 98%. The proportion of the expelled air provided by particular injection conditions can be measured on a test rig. The test rig reproduces the injection conditions of the gaseous product performed into the method of the invention or by the machine for manufacturing plastic containers of the invention. As an example, the test rig may further measure the proportion of oxygen gas into the gaseous content of a test preform immediately after said test preform has been subjected to the injection conditions under test. For example, the opening of the test preform may be closed by a cap immediately after said test preform has been subjected to the injection condition under test. When a preform is full of atmospheric air, the proportion of oxygen gas is 21%. If the proportion of oxygen gas immediately after said test preform has been subjected to the injection conditions under test is bellow 2.1%, and if the gaseous product injected during the injection step has no oxygen, this means that at least 90% of the air have been expelled by the injection conditions under test.

The applicant has found out that subjecting a preform to a steam flow for about 1 second, the quantity of steam being about twice to volume of the preform and the direction of the flow not being aligned with the main axis X-X of the preform provides test preforms having a proportion of oxygen gas just after steam injection between 1% and 2%. This means that 90% of the air present in the preform is expelled from said preform. It has also been tested an injection of a mixture containing one third of steam and two thirds of $CO_2$ with a flow rate of 10 times the volume of the preform per second. The injection during about one second with a gaseous injection nozzle parallel and not aligned with the central axis of the test preform provides a similar proportion of oxygen gas just after injection.

Consequently, the gaseous product injection step can be effectively performed while being of a short duration and while consuming little gaseous product such that the gaseous injection step does not impair the throughput of the machine and does not add a significant cost for the gaseous product.

The next station of the machine is a combined hydraulic forming, filling and capping station 11.

In station 11, each preform is enclosed in a hydraulic forming mold 12, which is sealed about the neck 13 of the preform.

Then the liquid 3 is injected into the preform under pressure by a liquid injection nozzle which is moved in a closed configuration, wherein the nozzle is in liquid tight connection with the finish of the preform. Then the injected liquid expands the preform until its outer wall is pressed against the inner wall 14 of the molding cavity 15 of the mold to form the container 2.

Inside the machine for manufacturing plastic containers of the invention, the duration of the travel of the preform from the gaseous product injection means 9 to the closing of a liquid injection nozzle inside the forming station 11 is advantageously shorter than 1 second, preferably shorter that 500 ms, even preferably shorter than 300 ms.

The pressure of the liquid can be as high as 50 bars, which results in a very good print of the container 2.

Finally, in station 11, each filled container is capped by a cap 16, then the mold is opened and the completed container or bottle is taken out of the mold.

In practice, as is well known in the art, the stations 4, 6, 9 and 11 are usually in the form of notched wheels, with robot arms transferring the preforms from one station to the next one.

Having the preform manufacturing station 4 close to the preform thermal conditioning station 6 reduces the energy requested by the conditioning station 6.

Having the steam injection station 9, or a gaseous injection station, located downstream the thermal conditioning station 6 reduces the duration between the injection step and a closing step inside the hydraulic forming mold 12, wherein the neck 13 of the preform is closed by a forming nozzle. Consequently, there is no time for air to return inside the preform after the gaseous injection step.

In an alternative embodiment, the station 4 of the machine 1 only supplies the preforms and the preforms are manufactured somewhere else. The station 4 is therefore a preform supply station. Such an alternative is particularly attractive for high production rate forming stations in which the production rate could be higher than in traditional preform manufacturing stations. It also makes the machine easier to implement in a factory.

In some embodiments, the caps 16 may be put on the containers at a station separate from the filling station. Also, the forming station may be separate from the filling or filling/capping station.

As an alternative, a sterilizing agent, e.g. $H_2O_2$ (hydrogen peroxide), can be added to the steam 10 to obtain a simultaneous sterilizing effect at station 9.

Figure 2:
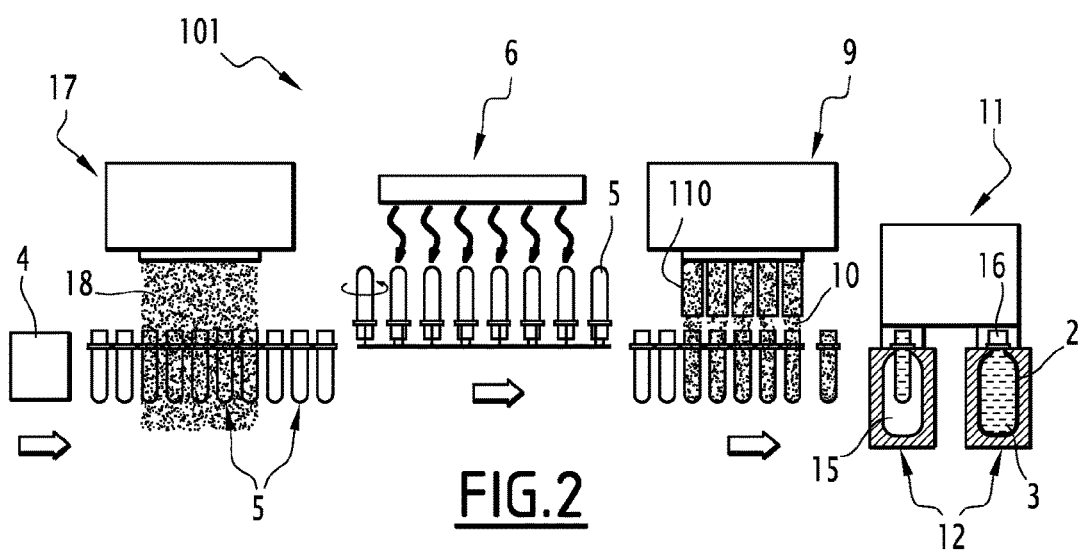

In the embodiment of the machine 101 seen in FIG. 2, the stations 4, 8, 9 and 11 are similar as described above. However, an additional sterilizing station 17 is disposed between the stations 4 and 6, or between stations 6 and 9. At station 17, a sterilizing agent 18, e.g. $H_2O_2$ vapor, is sprayed into the preforms 5 having their opening 7 directed upwards.

Such $H_2O_2$ sterilizing method is well known under the trade name Predis™'

It will be understood that the steam injection at station 9 will at least not affect the level of sterility of the preforms, and will reduce the residuals of $H_2O_2$ in the preforms.

As an alternative embodiment, steam may be replaced or combined with another gaseous product which is absorbable in the liquid 3, e.g. $CO_2$. The station 9 is therefore a gaseous injection station, in which the preforms can be directed upwards or downwards depending on the injected gaseous product and the injection parameters. The gaseous injection station injects the gaseous product such as to expel air from the preform. As an alternative embodiment, the preform thermal conditioning station 6 may heat preforms having a neck oriented upwards or downwards.

In an alternative embodiment, the invention covers a method for manufacturing plastic containers 2 containing a final liquid 3 to be contained by the container, the method comprising successively for each container: manufacturing a plastic preform 5, injecting gaseous product in the preform such as to expel air from the preform, expanding the preform to a container 2 by injecting a forming liquid, the gaseous product being absorbed by the forming liquid, and then the container is filled by the final liquid to contained by the container. In particular the forming liquid is the forming liquid or a portion thereof, e.g. water without some additives of the final liquid.

In an alternative embodiment, the machine comprises an injection nozzle through which a gaseous product absorbable by the forming liquid can be injected into the preform. The injection nozzle is designed to inject the gaseous product into the preform and further comprises an exhaust conduit provided with a closing valve. In such embodiment, the air previously contained by the preform can be expelled out through the exhaust conduit. The closing valve can then be closed to start the forming step, and in particular the forming and filling step.

In an alternative embodiment, the injection conditions of steam may be such that droplets are formed on the inner surface of the preform wall. This provides the preform with additional calories and increases a little bit the temperature of said inner surface with respect to the outside surface of the preforms. In such an embodiment, the steam injection flow rate and duration are such as to compensate the reduction of volume due to the droplet condensation, in order to continue to expel air from the preform.

The injection conditions may include, as a non-exhaustive list: injection location, injection direction, injection flow rate, injection pressure and injection duration. The injection location is the point, with respect to the preform, from which the gaseous product is injected towards the inside of the preform. For example, it could be injected from the neck opening, e.g. in the form of a gas curtain laterally offset from the central axis of the series of preforms, as disclosed previously. The injection direction could be single or plural, and there may be one injection point, or several injection points. The injection conditions may also include the maximum duration between the end of the injection step and the neck closing step.

In the expression "such that the injected gaseous product expels said air from the preform", "said air" refers to the air contained in the preform before the injection step. The expelling of said air out of the preform means that the entire quantity or almost the entire quantity of air is expelled out. More precisely, the molar proportion of oxygen and nitrogen gas in the preform at the end of the gaseous product injection step is under a predetermined maximum value, typically under 10%, preferably under 5% or under 3%.

The machine comprises determination means of the above injection conditions. The determination means may comprise an input port receiving information related to the type of preform to be transformed into a container, or a sensor providing a control unit with the same information. The determination means may further comprise a memory containing data structured such that for each preform type, the data corresponds to injection conditions with which the gaseous product injection means can be used to expel the air previously contained in the preform of said type.

The invention claimed is:

1. A method for manufacturing plastic containers, the method comprising, for each container:
    (a) a preform supply step in which a plastic preform containing air is supplied;
    (b) a thermal conditioning step in which the preform is heated at a preform temperature over the glass temperature of the preform material,
    (c) an inserting step in which the preform is inserted in a mold having a mold cavity; and
    (d) a forming step in which the preform is expanded to a container having the shape of the mold cavity by means of a forming liquid;

wherein the method comprises a gaseous product injection step (g) between steps (b) and (d), and during said gaseous product injection step, a gaseous product is injected into the preform containing air, said gaseous product being absorbable by said forming liquid, the injection conditions of the gaseous product being determined such that the injected gaseous product expels said air out of the preform, and wherein the gaseous product is still present in the preform when the forming step (d) begins.

2. A method according to claim 1, wherein the injected gaseous product expels at least 90% of the air present in the preform before said gaseous product injection step (g).

3. A method according to claim 1, wherein the preform extends along a main axis, the direction of the injection of the gaseous product being parallel to the main axis and radially offset relative to said main axis such that the gaseous product is injected in the vicinity of the inner wall of the preform.

4. A method according to claim 3, wherein the injection of the gaseous product is arranged such that the gaseous product flows against at least part of the inner wall of the preform.

5. A method according to claim 1, wherein said gaseous product is absorbed by the forming liquid during the forming step (d).

6. A method according to claim 1, comprising a neck closing step (n) during which a neck of the preform is closed by a filling nozzle, the gaseous product injection step (g) taking place before the neck closing step (n).

7. A method according to claim 1, wherein the forming step (d) uses a forming liquid different from a final liquid to be contained by the container.

8. A method according to claim 1, wherein the forming step (d) uses a final liquid to be contained by the container as said forming liquid, whereby said forming step (d) is a combined forming and filling step.

9. A method according to claim 1, wherein said gaseous product comprises steam.

10. A method according to claim 9, wherein said steam is saturated steam.

11. A method according to claim 10, wherein said steam is injected at a steam temperature lower than the temperature of the preform (5).

12. A method according to claim 1, wherein said steam is injected at a steam temperature such that steam does not form liquid droplets inside the preform before step (d).

13. A method for manufacturing plastic containers, the method comprising, for each container:
(a) a preform supply step in which a plastic preform containing air is supplied;
(b) a thermal conditioning step in which the preform is heated at a preform temperature over the glass temperature of the preform material,
(c) an inserting step in which the preform is inserted in a mold having a mold cavity; and
(d) a forming step in which the preform is expanded to a container having the shape of the mold cavity by means of a forming liquid;
wherein the method comprises a gaseous product injection step (g) between steps (b) and (d), and during said gaseous product injection step, a gaseous product is injected into the preform containing air, said gaseous product being absorbable by said forming liquid, the injection conditions of the gaseous product being determined such that the injected gaseous product expels said air out of the preform, said gaseous product comprising $CO_2$.

14. A method according to claim 1, further comprising a preform sterilizing step (f) upstream of said gaseous product injecting step (g).

15. A machine for manufacturing plastic containers, the machine comprising, for each container:
a plastic preform supply station supplying a plastic preform containing air;
a thermal conditioning station adapted to heat the preform at a temperature over the glass temperature of the preform material; and
a forming station comprising means for expanding the preform to a container having the shape of a mold cavity by means of a forming liquid,
wherein the machine comprises
a gaseous product injecting unit configured to inject a gaseous product into the preform containing air, said injecting unit being provided between said preform supply station (4) and said forming station, and
a determination unit configured to determine, for a particular preform type, injection conditions such that the gaseous product injected in the preforms of said type expels said air out from the preform
wherein the forming station is configured to begin to expand the preform with the forming liquid while the gaseous product is still present in the preform.

16. A machine according to claim 15, wherein said gaseous product injecting unit comprise at least one nozzle extending along an axis parallel to the main axis of the preform, when said preform is placed opposite said nozzle, the axis of the nozzle being radially offset relative to the axis of the preform.

17. A machine according to claim 15, wherein said gaseous product injecting unit is located immediately upstream the forming station.

18. A machine according to claim 15, wherein the supply station is a preform manufacturing station.

19. A machine according to claim 15, further comprising a preform sterilizing station upstream of said gaseous product injecting means and said molding station.

20. A machine according to claim 15, wherein the gaseous product injecting unit is located downstream the thermal conditioning station.

21. A machine for manufacturing plastic containers, the machine comprising, for each container:
a plastic preform supply station supplying a plastic preform containing air;
a thermal conditioning station adapted to heat the preform at a temperature over the glass temperature of the preform material;
a forming station comprising means for expanding the preform to a container having the shape of a mold cavity by means of a forming liquid;
a gaseous product injecting unit configured to inject a gaseous product into the preform containing air, said injecting unit being provided in said forming station;
a determination unit configured to determine, for a particular preform type, injection conditions such that the gaseous product injected in the preforms of said type expels said air out from the preform; and
wherein the forming station is configured to begin to expand the preform with the forming liquid while the gaseous product is still present in the preform.

* * * * *